G. CAEN, Sr.
FILTER.
APPLICATION FILED NOV. 2, 1917.
1,284,233.
Patented Nov. 12, 1918.
2 SHEETS—SHEET 1.
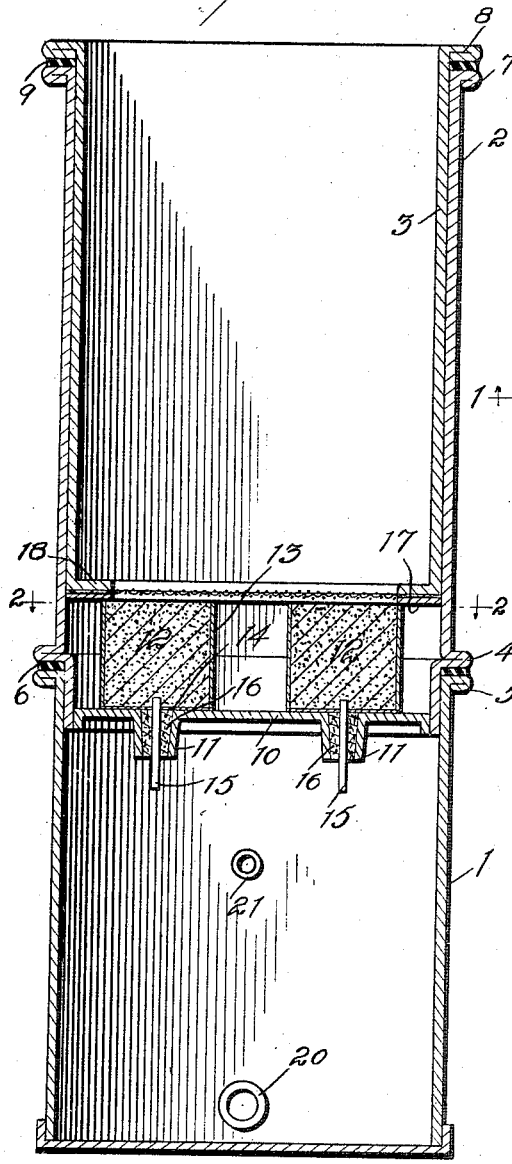
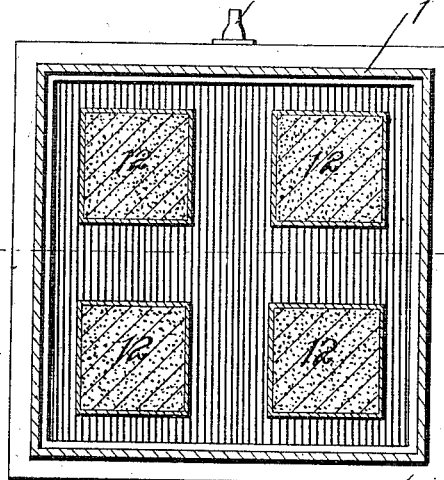
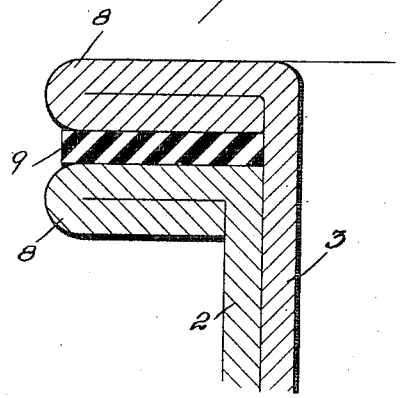
WITNESSES
INVENTOR
George Caen Sr,
BY
ATTORNEYS G. CAEN, Sr.
FILTER.
APPLICATION FILED NOV. 2, 1917.
1,284,233.
Patented Nov. 12, 1918.
2 SHEETS—SHEET 2.
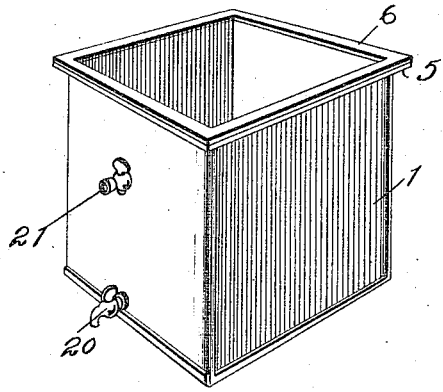
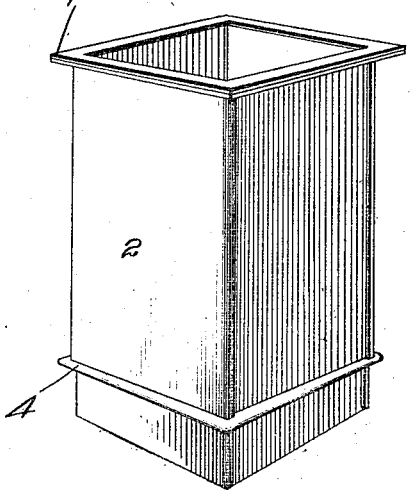
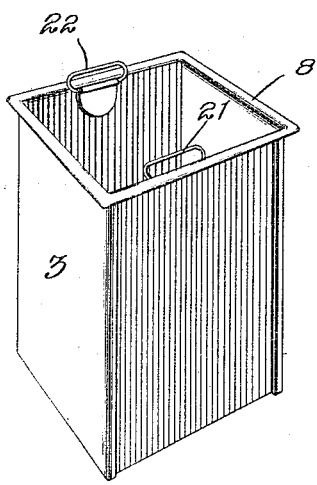
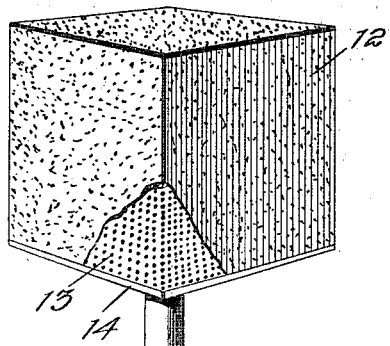
WITNESSES
INVENTOR
George Caen Sr.
BY
ATTORNEYS

UNITED STATES PATENT OFFICE.

GEORGE CAEN, SR., OF SAN ANTONIO, TEXAS, ASSIGNOR TO EARLY NORTHRUP, OF SAN ANTONIO, TEXAS.

FILTER.

1,284,233.   Specification of Letters Patent.   Patented Nov. 12, 1918.

Application filed November 2, 1917.   Serial No. 199,890.

*To all whom it may concern:*

Be it known that I, GEORGE CAEN, Sr., a citizen of the United States, and a resident of San Antonio, in the county of Bexar and State of Texas, have invented certain new and useful Improvements in Filters, of which the following is a specification.

My invention is an improvement in filters, and has for its object to provide a device of the character specified, especially adapted for removing impurities from gasolene and oil, to fit the gasolene or oil for reuse.

In the drawings:

Figure 1 is a vertical section;

Fig. 2 is a top plan view of the filter chamber;

Fig. 3 is a perspective view of the lower section or receiving chamber;

Fig. 4 is a similar view of the outer casing of the upper section or filter chamber;

Fig. 5 is a perspective view of the inner casing of the filter chamber;

Fig. 6 is a perspective view of one of the filtering elements; and

Fig. 7 is an enlarged detail section of the joint between the sections.

In the present embodiment of the invention, a casing is provided, consisting of a lower section 1 and an upper section consisting of an outer casing 2 and an inner casing 3, the casings and the lower section being of square cross section, as shown more particularly in Figs. 3, 4 and 5. The outer casing of the upper section has an outwardly extending continuous rib 4 near its lower end, formed, in the present instance, by doubling a portion of the casing upon itself, and the portion of the casing below the rib fits within the upper end of the section 1. The said upper end has its upper edge bent outwardly and inwardly to form a rib 5 upon which the rib 4 seats, a gasket 6 of rubber or the like being seated between the ribs.

The upper end of the outer casing 2 is similarly ribbed, as shown at 7, and the inner casing 3 which fits within the outer casing has a similar rib 8 which seats upon the rib 7, a gasket 9 being interposed between the ribs. The bottom 10 of the outer casing of the upper section has depending nipples 11, in the present instance four nipples being provided, and a filter unit is arranged at each nipple. It will be obvious that the number of nipples will depend upon the size of the filter, the units being spaced apart from each other, as shown.

Each of the filter units, as shown more particularly in Fig. 6, consists of a block 12 of porous carbon compound, each block having its side walls covered by a casing 13 of perforate material, as, for instance, thin sheet metal provided with closely spaced perforations. The bottom of the block is covered by a sheet or plate 14 of imperforate material, as for instance, sheet metal, and this plate has its edges upset over the lower end of the covering 13.

A pipe 15 extends from the center of the bottom of each of the plates 14, and these pipes are adapted to extend through the nipples 11, a filling 16 of cork or the like being arranged between each pipe and the nipple.

In the present instance, as before stated, four units are used, and a square frame 17 is seated upon the units, the said frame extending over the edges of the upper face of the units, and the lower edge of the inner casing 3 of the upper section has an inwardly extending flange 18 which fits upon the frame.

A filling 19 of perforate material covers the space within the rib, forming the bottom of the inner casing and serving as a strainer for the removal of the coarser impurities. The lower section of the casing has a discharge valve 20 near its bottom, and another valve 21 intermediate its top and bottom and nearer the top than the bottom, and the inner casing of the upper section has handles 22 for convenience in removing and replacing the same. In practice, the gaskets 6 and 9 will be secured to the ribs 5 and 7, respectively.

In use, the gasolene or oil to be filtered is poured into the inner casing of the upper section, with the parts in the position of Fig. 1. The oil or gasolene passes down through the filter units, and gradually passes out through the pipes 15 into the receiving section 1, from whence it may be drawn off by the valve 20. During its passage through the material of the filter units the oil or gasolene is thoroughly cleansed, being delivered in a pure state fit for reuse. The filter may be easily disassembled for cleaning or the like.

The filling 19 of perforate material forming the bottom of the inner casing is primarily intended as a holder for a filtering compound which is used for the removal of coarse impurities and the destruction of coloring matter.

I claim:

1. A filter comprising a casing consisting of a lower or receiving section, an upper or filter section composed of inner and outer casings, the lower end of the outer casing fitting within the upper end of the lower section and the bottom of said outer casing having a series of nipples, filter units seated on the bottom and having delivery pipes extending through the nipples, the inner casing of the upper section having an inwardly extending flange engaging the units to hold them in place and having a perforate filling at the flange, for the purpose specified, each filter unit comprising a block of porous carbon, an imperforate plate on the bottom of the block and provided with a discharge pipe for extending through the nipple, and a covering of perforate material for the side walls of the block.

2. A filter comprising a casing consisting of a lower or receiving section, an upper or filter section composed of inner and outer casings, the lower end of the outer casing fitting within the upper end of the lower section and the bottom of the said outer casing having a series of nipples, and filter units seated on the bottom and having delivery pipes extending through the nipples, the inner casing of the upper section having an inwardly extending flange engaging the units to hold them in place and having a perforate filling at the flange for the purpose specified.

3. A filter comprising a casing composed of upper and lower sections, the lower end of the upper section fitting within the upper end of the lower section and having nipples depending into the lower section, filter units having discharge pipes extending through the nipples, a casing seated in the upper section and having a perforate bottom resting upon the filter units.

GEORGE CAEN, Sr.

Copies of this patent may be obtained for five cents each, by addressing the "Commissioner of Patents, Washington, D. C."